(12) United States Patent
Seki et al.

(10) Patent No.: US 6,530,447 B2
(45) Date of Patent: Mar. 11, 2003

(54) TWO-WHEEL DRIVE/FOUR-WHEEL DRIVE SWITCHING DEVICE FOR A VEHICLE

(75) Inventors: Bunzo Seki, Saitama (JP); Hideaki Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/821,055

(22) Filed: Mar. 30, 2001

(65) Prior Publication Data

US 2001/0035309 A1 Nov. 1, 2001

(30) Foreign Application Priority Data

Mar. 30, 2000 (JP) ......................................... 2000-095628
Jun. 27, 2000 (JP) ......................................... 2000-192131

(51) Int. Cl.$^7$ .............................................. F16D 47/00
(52) U.S. Cl. ......................................... 180/233; 192/44
(58) Field of Search ................................ 180/233, 247, 180/248, 249; 701/69; 192/44

(56) References Cited

U.S. PATENT DOCUMENTS

| | | | | |
|---|---|---|---|---|
| 5,195,604 A | * | 3/1993 | Brockett et al. | 180/244 |
| 5,924,510 A | * | 7/1999 | Itoh et al. | 180/197 |
| 6,033,334 A | * | 3/2000 | Showalter | 180/249 |
| 6,155,395 A | * | 12/2000 | Braford, Jr. | 180/247 |
| 6,244,403 B1 | * | 6/2001 | Ito et al. | 192/35 |

* cited by examiner

*Primary Examiner*—Kevin Hurley
(74) *Attorney, Agent, or Firm*—Birch, Stewart, Kolasch & Birch, LLP

(57) ABSTRACT

To provide a two-wheel drive/four-wheel drive switching device for a vehicle capable of applying both rear braking and engine braking to front and rear wheels even when the vehicle is in a two-wheel drive mode. In a vehicle capable of running while switching between two-wheel drive and four-wheel drive, when the rear wheel speed becomes lower than the front wheel speed in the two-wheel drive mode, switching to four-wheel drive mode is carried out.

15 Claims, 6 Drawing Sheets

TWO-WHEEL DRIVE/FOUR-WHEEL DRIVE SWITCHING DEVICE FOR A VEHICLE

BACKGROUND OF THE INVENTION

1. Field of the Invention

The present invention relates to a two-wheel drive/four-wheel drive switching device for a vehicle.

2. Description of Background Art

A vehicle which is capable of running while switching between two-wheel drive and four-wheel drive has previously been known.

FIGS. 4 and 5 illustrate an example of such a vehicle. In both figures, the vehicle, indicated by reference numeral 1, is substantially composed of a body frame 3 with an engine 2 mounted centrally thereon. Front wheels 4 and rear wheels 5 are disposed on both sides of front and rear portions of the body frame 3. A steering handle 6 is disposed at a front upper position of the body frame 3 to steer the front wheels 4. A fuel tank 7 is mounted to the body frame 3 above the engine 2. Furthermore, a seat 8 is mounted behind the fuel tank 6.

As shown in FIG. 5, the front wheels 4 are supported vertically movably by suspension systems 9 disposed on both sides of the front portion of the body frame 3. Likewise, the rear wheels 5 are supported vertically movably by suspension systems 10 disposed on both sides of the rear portion of the body frame 3.

A final reduction gear 13 for the front wheels 4 and a final reduction gear 14 for the rear wheels 5, respectively, are mounted in front and rear central portions of the body frame 3. The final reduction gears 13 and 14 are connected to the engine 2 through propeller shafts 11 and 12, respectively. The right and left front wheels 4 and the right and left rear wheels 5 are connected respectively to the final reduction gear 13 for the front wheels 4 and the final reduction gear 14 for rear wheels 5.

For example, between the final reduction gear 13 for the front wheels 4 and the propeller shaft 11 is disposed a two-wheel drive/four-wheel drive switching device which makes and breaks the transfer of power to the front wheels 4, thereby switching between a rear-wheel drive mode and a four-wheel drive mode.

Alternatively, the two-wheel drive/four-wheel drive switching device is disposed between the rear propeller shaft 12 and the final reduction gear 14 for the rear wheels 5 to switch over between a front-wheel drive mode and a four-wheel drive mode.

This switching between a front-wheel drive mode and a four-wheel drive mode is conducted by the driver, as necessary, according to the state of the road surface and the running mode of the vehicle.

For example, a switching device of such a structure as shown in FIG. 6 has been proposed to be used as the two-wheel drive/four-wheel drive switching device of the background art.

Also in FIG. 6, a two-wheel drive/four-wheel drive switching device, indicated by reference numeral 15, is made up of two input shaft halves 16a and 16b. The input shaft halves 16a and 16b are formed by axially bisecting an input shaft 16 of the final reduction gear 13 for the front wheels 4 and butting the input shaft halves 16a and 16b in alignment with each other. Furthermore, a switching unit 17 is provided for connecting and disconnecting the input shaft halves 16a and 16b from and to each other.

To be more specific, a cylindrical positioning protrusion 18 is formed centrally on an end face of the input shaft half 16a, which is positioned on the final reduction gear 13 side. Furthermore, a positioning recess 19 for rotatably fitting with the positioning protrusion 18 is formed centrally on an end face of the input shaft half 16b, which is positioned remote from the final reduction gear side. Both input shaft halves 16a and 16b are in butting relationship with each other and the positioning protrusion 18 and the positioning recess 19 are fitted together, whereby both input shaft halves 16a and 16 are aligned and connected with each other so as to be relatively rotatable with respect to each other.

Outer peripheral surfaces of the abutting portions of both input shaft halves 16a and 16b are splined (not shown) and the switching unit 17 is disposed so as to surround the abutting portions.

The switching unit 17 has a splined inner surface and is slidably fitted to the abutting portions of both input shaft halves 16a and 16b. The switching unit 17 is made up of a switching ring 20 adapted to be engaged with and disengaged from each of the splines and a drive mechanism 21 constituted by a solenoid. The drive mechanism 21 causes the switching ring 20 to slide axially with respect to both input shaft halves 16a and 16b to selectively move to a position where the switching ring 20 is brought into engagement with the spline of only one input shaft halve 16a and a position where the switching ring is brought into engagement with the splines of both input shaft halves 16a and 16b.

In the two-wheel drive/four-wheel drive switching device 15, the switching ring 20 is moved in one direction by the drive mechanism 21 and is brought into engagement with only one input shaft half 16a to cut off the transfer of driving force to the front wheels 4, affording a two-wheel drive mode of driving only the rear wheels. Furthermore, the switching ring 20, in an engaged state thereof with one input shaft half 16a, is slid into engagement with the other input shaft half 16b to connect both input shaft halves 16a and 16b with each other, thereby transmitting the driving force to the front wheels 4 and thus affording a four-wheel drive mode in which the front and rear wheels 4 and 5 are driven simultaneously.

In the two-wheel drive/four-wheel drive switching device 15 of the background art, there remains the following problems to be solved.

In the case where a braking operation is performed with the rear brake in a two-wheel drive mode, for example, a braking force is exerted on the rear wheels 5 and not on the front wheels 4, so that a difference in brake feeling between two- and four-wheel drive modes occurs. The same problem occurs under the action of engine braking as well.

For solving such a problem with the background art device, it is necessary to construct a brake setting which is consistent in both two-wheel drive and four-wheel drive modes. This can be done by using a complicated control mechanism, which, however, results in an increase of cost.

SUMMARY OF THE INVENTION

The present invention has been accomplished in view of the above-mentioned problems of the background art, and it is an object of the present invention to provide a two-wheel drive/four-wheel drive switching device capable of exerting both rear braking and engine braking on the front and rear wheels.

According to a first aspect of the present invention, there is provided a two-wheel drive/four-wheel drive switching device for a vehicle which is capable of running while switching between two-wheel drive and four-wheel drive, wherein when the rear wheel speed becomes lower than the front wheel speed in a two-wheel drive mode, switching is made to the four-wheel drive mode.

According to a second aspect of the present invention, there is provided a two-wheel drive/four-wheel drive switching device for a vehicle, wherein a switching unit is provided in a power transfer mechanism disposed between an engine and front wheels or between the engine and rear wheels. The switching unit functions to make and break the transfer of power in the power transfer mechanism, and comprises a drive shaft connected to a drive side, a driven shaft fitted to the drive shaft with an annular clearance therebetween, a plurality of engaging and disengaging members disposed within the clearance between the drive shaft and the driven shaft and brought into engagement with and disengagement from opposed surfaces of both drive and driven shafts to connect and disconnect the shafts from and to each other, a switching mechanism for positioning the engaging/disengaging members selectively at a connecting position and a disconnecting position for the drive shaft and the driven shaft, and an elastic member for biasing said engaging/disengaging member in the direction where the drive shaft is engaged to the driven shaft, wherein the engaging/disengaging members are moved in a direction to disconnect the drive shaft and the driven shaft from each other against the elastic force of the elastic member, with rotation of the drive shaft in a two-wheel drive mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 4:
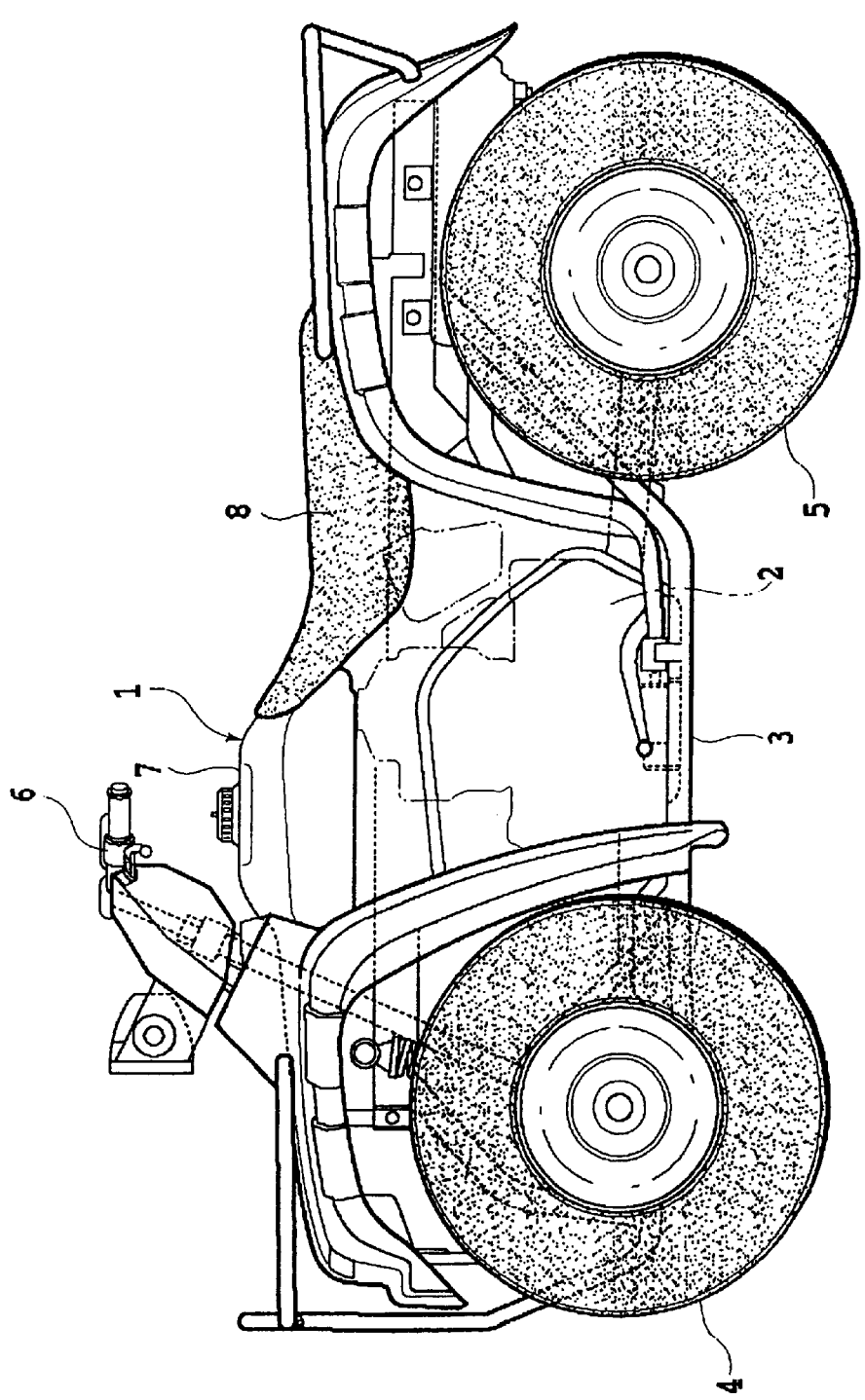
FIG. 4 is a side view showing an example of a vehicle provided with a two-wheel drive/four-wheel drive switching device.
Figure 5:
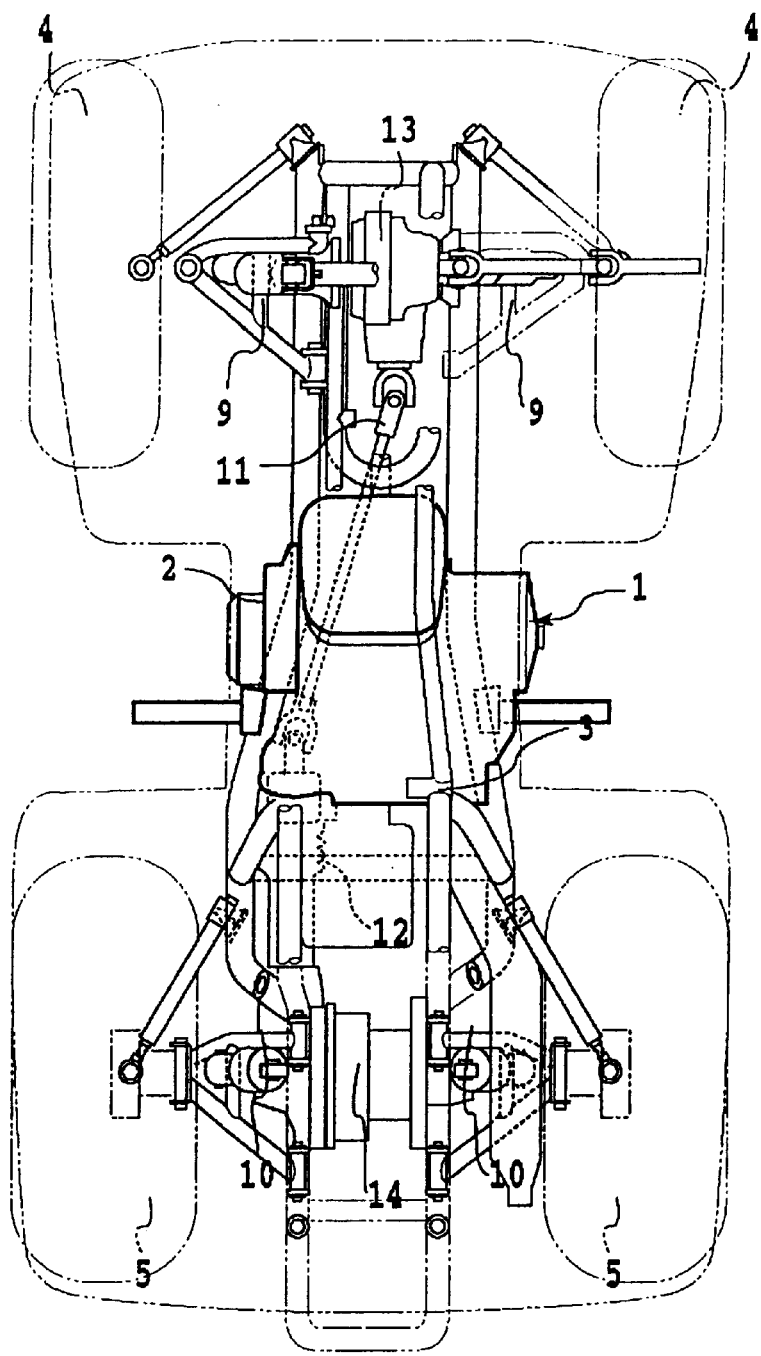
FIG. 5 is a plan view for explaining a body configuration of the vehicle shown in FIG. 4.
Figure 6:
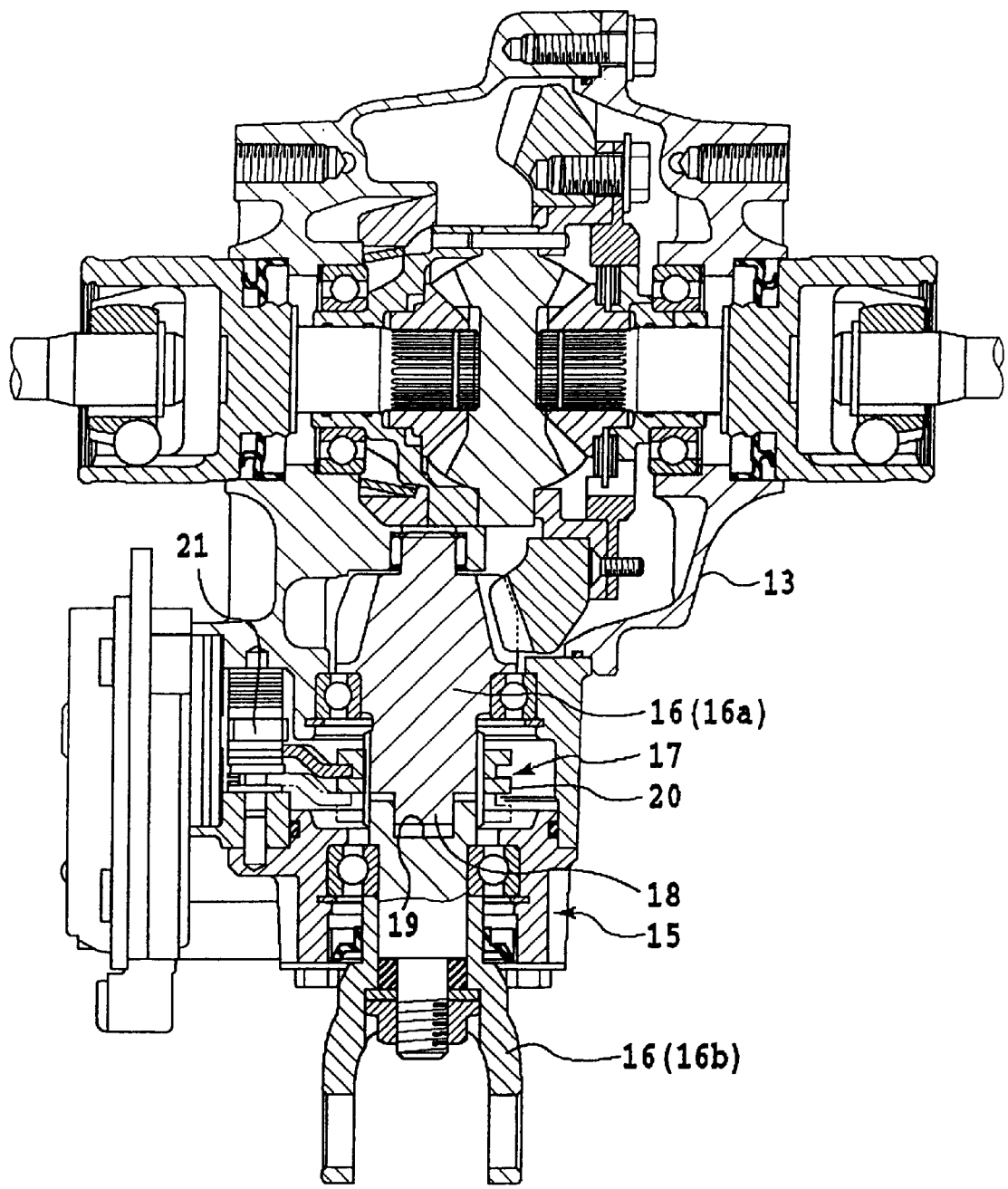
FIG. 6 is a sectional view of principal portions, showing an example of structure of a two-wheel drive/four-wheel drive switching device according to the background art.

An embodiment of the present invention will now be described with reference to FIGS. 1 to 3. In the following description, the main vehicular components are common to those shown in FIGS. 4 and 5. Therefore, they will be identified by the same reference numerals, and explanations thereof will be omitted.

Figure 1:
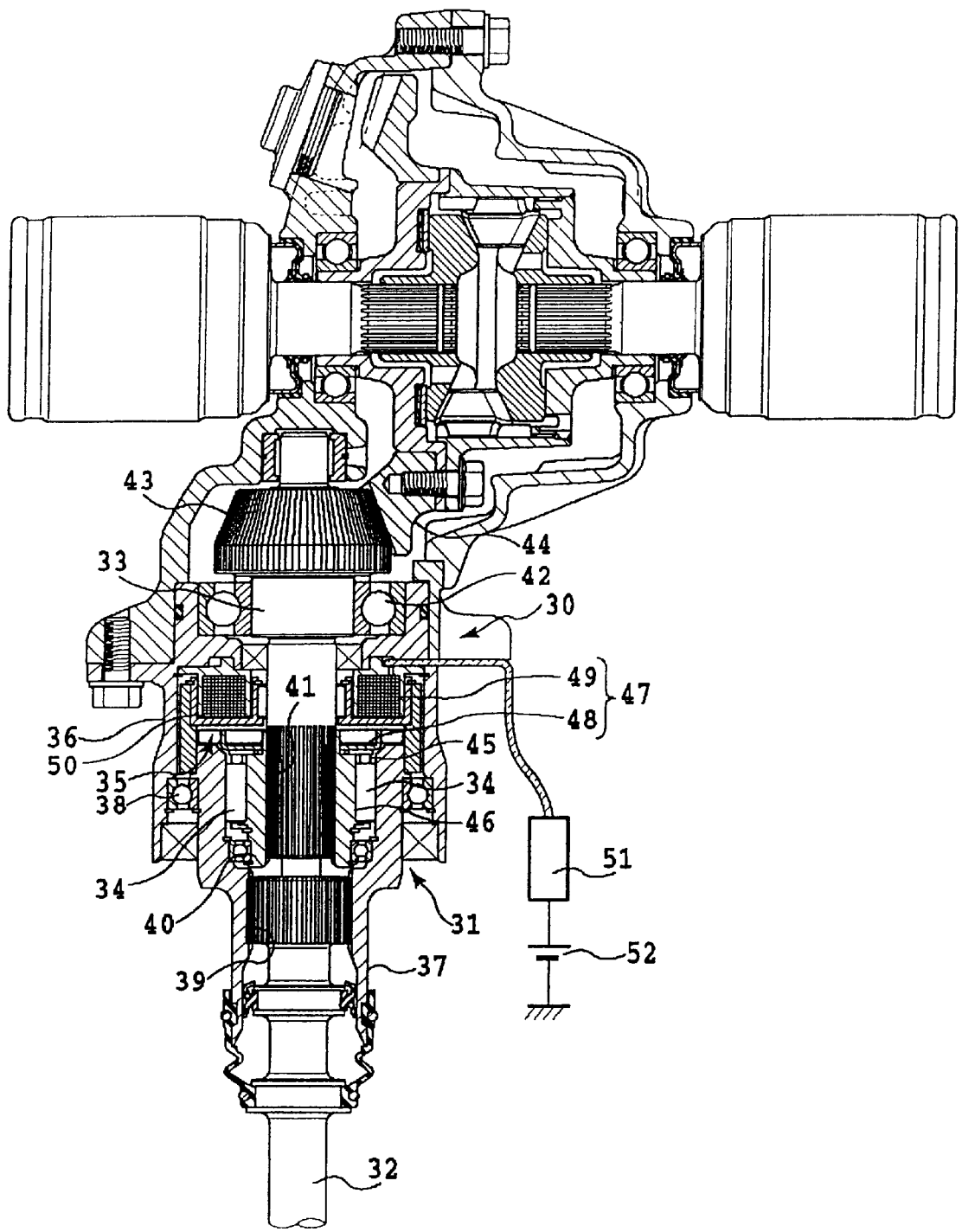
FIG. 1 is a sectional view illustrating an embodiment of the present invention.

A two-wheel drive/four-wheel drive switching device (hereinafter referred to simply as the "drive switching device") according to this embodiment, which is indicated by reference numeral 30 in FIG. 1, is provided in a power transfer mechanism disposed between the front wheels 4 and the engine 2. The drive switching device 30 includes a switching unit 31 which makes and breaks the transfer of power in the power transfer mechanism. The switching unit 31 is substantially composed of a drive shaft 32 connected to the drive side, a driven shaft 33 which is fitted to the drive shaft 32 through an annular clearance, and a plurality of engaging/disengaging members 34 disposed in the clearance between the drive shaft 32 and the driven shaft 33. The engaging/disengaging members 34 are brought into engagement with and disengagement from opposed surfaces of both shafts to connect and disconnect the shafts from and to each other. Furthermore, a switching mechanism 35 is for positioning the engaging/disengaging members 34 selectively at a connecting position and a disconnecting position for the drive shaft 32 and the driven shaft 33. In addition, a casing 36 surrounds the above components of the switching unit.

A more detailed description will now be provided. In this embodiment, a cylindrical outer ring 37 which projects toward the engine side is rotatably provided within the casing 36 through a bearing 38.

An inner peripheral surface of an engine-side end portion of the outer ring 37 is splined at a spline 39 and the drive shaft 32 is inserted into the outer ring 37 so as to engage the spline 39, whereby the drive shaft 32 and the outer ring 37 are connected together.

A cylindrical inner ring 40 is disposed within the outer ring 37 so as to leave a predetermined annular spacing between the cylindrical inner ring 40 and an inner peripheral surface of the outer ring 37.

An inner surface of the inner ring 40 is splined at a spline 41 and the driven shaft 33, which is inserted into the casing 36, is connected to the inner ring 40 through the spline 41.

A longitudinally intermediate portion of the driven shaft 33 is supported rotatably by means of a bearing 42 which is mounted to the casing 36.

A bevel gear 43 is integral with an end portion of the driven shaft 33 and is engaged with a ring gear 44 which constitutes the final reduction gear 13 for front wheels.

Figure 2:
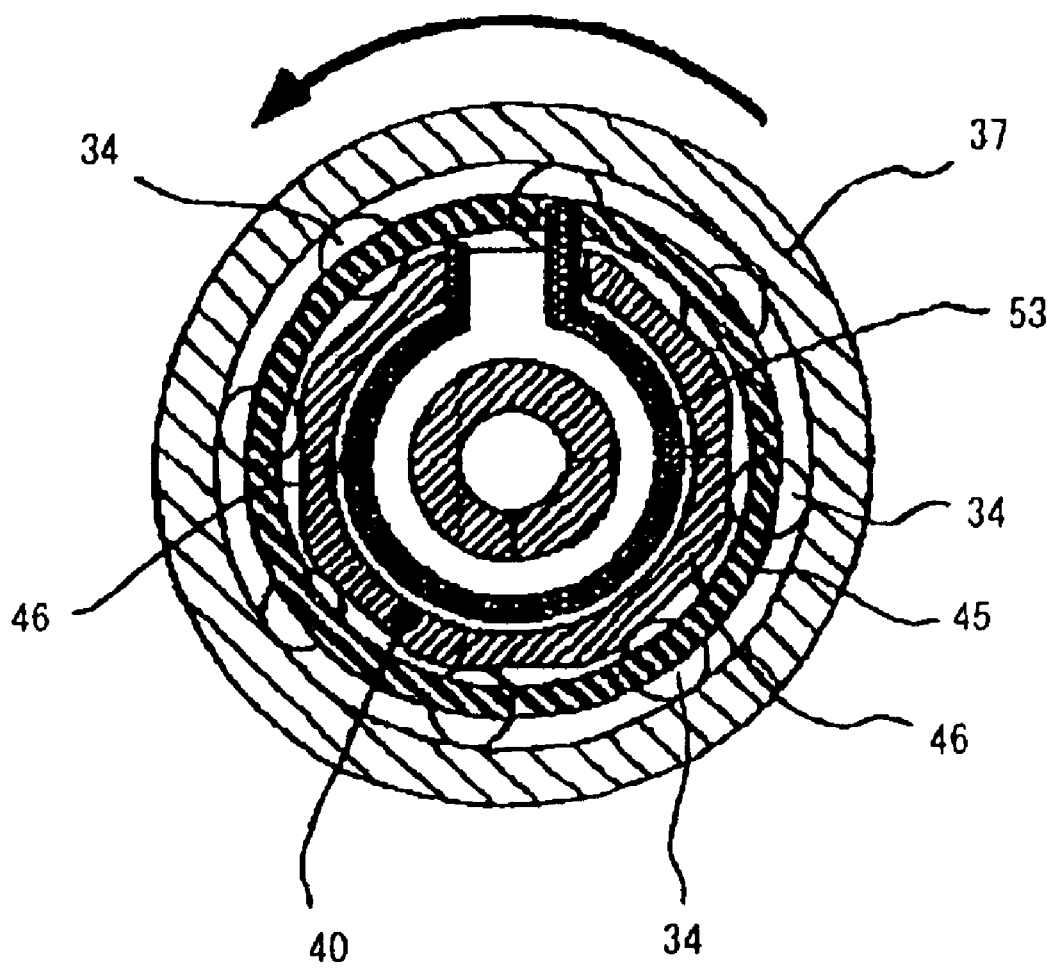
FIG. 2 is a vertical sectional view of a principal portion in the embodiment.

As shown in FIGS. 1 and 2, the engaging/disengaging members 34 which constitute the switching unit 31 are constituted by plural rollers disposed in parallel with the axis of the outer ring 37. The switching mechanism 35 is composed of a retainer 45 which holds the engaging/disengaging members 34 rotatably and which is fitted to the outer ring 37 in a relatively rotatable manner (relatively movably about the axis) and a cam 46 which is formed on the surface of the inner ring 40 and which causes the engaging/disengaging members 34 to move radially as a relative movement with respect to the retainer 45 proceeds.

Between the retainer 45 and the inner ring 40 is disposed an elastic member 53 which biases the retainer 45 in a direction opposite to the direction in which the drive shaft 32 rotates during forward movement of the vehicle 1, thereby biasing the engaging/disengaging members 34 in a direction in which the outer ring 37 and the inner ring 40 are connected together.

The elastic member 53 is formed in a generally C shape, having end portions engaged with the retainer 45 and the inner ring 40 respectively in the rotational direction. The elastic member 53 is mounted in a contracted state of its diameter.

At an end portion of the outer ring 37 positioned inside the casing 36 is mounted an electromagnetic clutch 47 which fixes and disconnects the retainer 45 and the outer ring 37 from and to each other and which constitutes the switching mechanism 35.

The electromagnetic clutch 47 is made up of a clutch disc 48 disposed between the retainer 45 and the outer ring 37 and an electromagnetic coil 49 for engagement and release of the clutch disc 48.

The electromagnetic coil 49 energizes the clutch disc 48 to bring the clutch disc into an engaged state, whereby the retainer 45 and the outer ring 37 are fixed so as not to permit relative rotation.

The electromagnetic coil 49 is formed in an annular shape and is received within a housing 50 which is also formed in an annular shape and which constitutes an iron core. The housing 50 is fitted to the casing 36 so as to surround the driven shaft 33 and is secured to the casing 36 thereby.

The outer ring 37, inner ring 40 and switching mechanism 35 are installed into the casing 36 and are unitized thereby. As shown in FIG. 1, in a mounted state of the driven shaft 33, the casing 36 is bolted to a case of the final reduction gear 13 for front wheels 4 and is thus mounted to the casing 36.

A control unit 51 for controlling ON-OFF of the electromagnetic coil 49 and a power supply 52 for supplying a driving power to the electromagnetic coil 49 are connected to the coil 49.

In the drive mode switching device 30 of this embodiment thus constructed, for canceling the transfer of driving force to the front wheels 13, the supply of electric power to the electromagnetic coil 49 is interrupted to let the electromagnetic clutch 47 disconnect the retainer 45 and the outer ring 37 from each other.

Figure 3A:
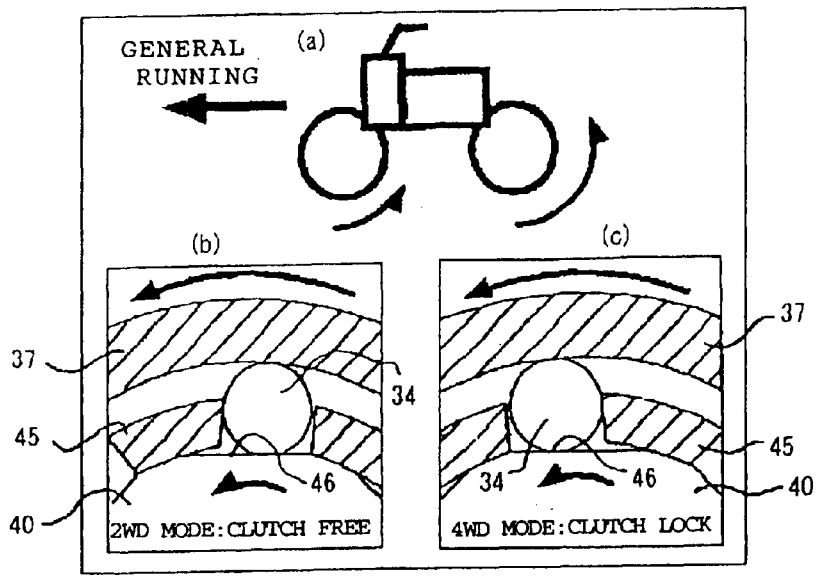
FIGS. 3(a) and 3(b) are enlarged sectional views of a principal portion for explaining the operation of a two-wheel drive/four-wheel drive switching device according to the embodiment.

In this state, as shown in region (b) of FIG. 3(a), the engaging/disengaging members 34 are biased to one top portion of the cam 46 and are abutted against both outer ring 37 and inner ring 40 elastically by the elastic member 53. However, since the rotational force of the outer ring 37 is large as indicated with arrows in regions (a) and (b) of FIG. 3(a), the engaging/disengaging members 34 are moved by the outer ring 37 in a direction to disconnect the outer ring from the inner ring 40 against the biasing force of the elastic member 53.

As a result, the outer ring 37 and the inner ring 40 are disconnected from each other, so that the rotation of the drive shaft 32 is prevented from being transmitted to the driven shaft 33, that is, the rotation of the front wheels 13 is stopped.

Figure 3B:
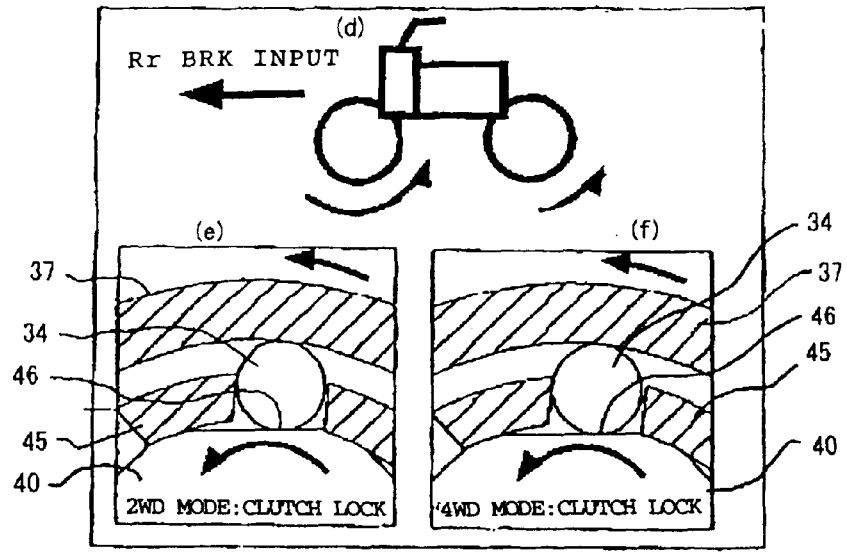

In such a two-wheel drive mode, if a braking operation is applied to the rear wheels 5, the rotational force of the outer ring 37 decreases, whereby the engaging/disengaging members 34, which are biased by the elastic member 53, are moved toward one top portion of the cam 46, as indicated with arrows in regions (d) and (e) of FIG. 3(b).

Consequently, the front and rear wheels 4 and 5 are connected and brakes are applied to the front and rear wheels.

This is also the case with the application of engine braking.

For switching to the four-wheel drive mode, the electromagnetic coil 49 is energized to engage the electromagnetic clutch 47, thereby fixing the retainer 45 to the outer ring 37.

As a result, the engaging/disengaging members 34 held by the retainer 45 are moved together with the outer ring 37 up to the other top portion of the cam 46 formed on the inner ring 40 and is abutted against the inner surface of the outer ring 37, as shown in region (c) in FIG. 3(a).

As a result, the outer ring 37 and the inner ring 40 are connected together through the engaging/disengaging members 34, the drive shaft 32 and the driven shaft 33 are connected together, the rotation of the drive shaft 32 is transmitted to the driven shaft 33, and rotation of the front wheels 13 is started.

If the rear wheels 5 are braked in this four-wheel drive mode, the inner ring 40 is the first to rotate, whereby one top portion of the cam 46 formed on the inner ring 40 is brought into abutment against the engaging/disengaging members 34.

Consequently, the four-wheel drive mode is maintained and brakes are applied to the front and rear wheels 4 and 5 in the same way as above.

In the drive mode switching device 30 of this embodiment constructed as above, the outer ring 37 and the inner ring 40 are connected together under the action of the elastic member 53 when brakes are applied and the braking forces of rear brake and engine brake can be applied to the front and rear wheels 4 and 5.

The above function can be attained by such a simple configuration as the elastic member 53 being disposed between the retainer 45 and the inner ring 40.

The shapes and sizes of the components described in the above embodiment are only an example and may be changed in accordance with requests in design.

According to the present invention, as set forth above, no matter in which of two- and four-wheel drive modes the vehicle may be, the braking forces of rear braking and engine braking can be exerted on the front and rear wheels 4 and 5 when brakes are applied.

Furthermore, the above function can be attained by such a simple configuration as the elastic member 53 being engaged with the engaging/disengaging members 34.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel drive/four-wheel drive switching device for a vehicle, said vehicle being capable of running while switching between a two-wheel drive mode and a four-wheel drive mode, comprising:

a device for switching to the four-wheel drive mode when a rear wheel speed becomes lower than a front wheel speed, when the vehicle is in the two-wheel drive mode, wherein said device is a switching unit, said switching unit being provided in a power transfer mechanism disposed between an engine and front wheels of the vehicle or between the engine and rear wheels of the vehicle, said switching unit functioning to connect and disconnect the transfer of power in the power transfer mechanism and including:

a drive shaft connected to a drive side;

a driven shaft fitted to said drive shaft with an annular clearance therebetween;

a plurality of engaging/disengaging members disposed within the clearance between said drive shaft and said driven shaft and movable into engagement with and disengagement from opposed surfaces of said drive shaft and said driven shaft to connect and disconnect the drive shaft to and from the driven shaft;

a switching mechanism for selectively positioning said engaging/disengaging members at a connecting position and a disconnecting position for the drive shaft and the driven shaft; and a c-shaped elastic member for biasing said engaging/disengaging members in a direction where the drive shaft is engaged with the driven shaft, one end of said c-shaped elastic member projecting beyond another end, wherein said engaging/disengaging members are moved in a direction to disconnect the drive shaft and the driven shaft from each other against an elastic force of said elastic member, with rotation of said drive shaft when the vehicle is in a two-wheel drive mode.

2. The two-wheel drive/four-wheel drive switching device for a vehicle according to claim 1, wherein said switching mechanism comprises an electromagnetic clutch, said electromagnetic clutch including:

a clutch disc disposed between said engaging/disengaging members and said drive shaft; and a coil for energizing said clutch to engage and disengage said engaging/disengaging members and said drive shaft.

3. The two-wheel drive/four-wheel drive switching device for a vehicle according to claim 1, said switching unit further comprising:

a cylindrical outer ring, said cylindrical outer ring being in rotational engagement with said drive shaft;

a cylindrical inner ring; and a retainer, said retainer supporting said engaging/disengaging members between said cylindrical outer ring and said cylindrical inner ring for engagement therewith.

4. The two-wheel drive/four-wheel drive switching device for a vehicle according to claim 3, wherein said inner ring includes a cam surface on an outer periphery thereof, and said engaging/disengaging members are a plurality of rollers in engagement with said cam surface, said plurality of rollers being mounted at spaced intervals on said retainer.

5. The two-wheel drive/four-wheel drive switching device for a vehicle according to claim 1, wherein, during the two-wheel drive mode, if braking is applied to the rear wheels, a rotational force of said drive shaft decreases so that said engaging/disengaging members are biased by the elastic member so that brakes are applied to both the front and rear wheels.

6. A two-wheel drive/four-wheel drive switching device for a vehicle, comprising:

a switching unit, said switching unit being provided in a power transfer mechanism disposed between an engine and front wheels of the vehicle or between the engine and rear wheels of the vehicle, said switching unit functioning to connect and disconnect the transfer of power in the power transfer mechanism and comprising:

a drive shaft connected to a drive side;

a driven shaft fitted to said drive shaft with an annular clearance therebetween;

a plurality of engaging/disengaging members disposed within the clearance between said drive shaft and said driven shaft and movable into engagement with and disengagement from opposed surfaces of said drive shaft and said driven shaft to connect and disconnect the drive shaft to and from the driven shaft;

a switching mechanism for selectively positioning said engaging/disengaging members at a connecting position and a disconnecting position for the drive shaft and the driven shaft; and a c-shaped elastic member for biasing said engaging/disengaging members in a direction where the drive shaft is engaged with the driven shaft, one end of said c-shaped elastic member projecting beyond another end;

wherein said engaging/disengaging members are moved in a direction to disconnect the drive shaft and the driven shaft from each other against an elastic force of said elastic member, with rotation of said drive shaft when the vehicle is in a two-wheel drive mode.

7. The two-wheel drive/four-wheel drive switching device for a vehicle according to claim 6, wherein said switching mechanism comprises an electromagnetic clutch, said electromagnetic clutch including:

a clutch disc disposed between said engaging/disengaging members and said drive shaft; and a coil for energizing said clutch to engage and disengage said engaging/disengaging members and said drive shaft.

8. The two-wheel drive/four-wheel drive switching device for a vehicle according to claim 6, said switching unit further comprising:

a cylindrical outer ring, said cylindrical outer ring being in rotational engagement with said drive shaft;

a cylindrical inner ring; and a retainer, said retainer supporting said engaging/disengaging members between said cylindrical outer ring and said cylindrical inner ring for engagement therewith.

9. The two-wheel drive/four-wheel drive switching device for a vehicle according to claim 8, wherein said inner ring includes a cam surface on an outer periphery thereof, and said engaging/disengaging members are a plurality of rollers in engagement with said cam surface, said plurality of rollers being mounted at spaced intervals on said retainer.

10. The two-wheel drive/four-wheel drive switching device for a vehicle according to claim 6, wherein, during the two-wheel drive mode, if braking is applied to the rear wheels, a rotational force of said drive shaft decreases so that said engaging/disengaging members are biased by the elastic member so that brakes are applied to both the front and rear wheels.

11. A vehicle, comprising:

a body frame;

an engine mounted on said body frame;

a pair of propeller shafts driven in rotation by said engine for driving a pair of front wheels and a pair of rear wheels, respectively; and a two-wheel drive/four-wheel drive switching device for switching between a two-wheel drive mode and a four-wheel drive mode, said two-wheel drive/four-wheel drive switching device comprising:

a device for switching to the four-wheel drive mode when a rear wheel speed becomes lower than a front wheel speed, when the vehicle is in the two-wheel drive mode;

wherein said device is a switching unit, said switching unit being provided in a power transfer mechanism disposed between said engine and said front wheels or between said engine and said rear wheels, said switching unit functioning to connect and disconnect the transfer of power in the power transfer mechanism and including:
- a drive shaft connected to a drive side;
- a driven shaft fitted to said drive shaft with an annular clearance therebetween;
- a plurality of engaging/disengaging members disposed within the clearance between said drive shaft and said driven shaft and movable into engagement with and disengagement from opposed surfaces of said drive shaft and said driven shaft to connect and disconnect the drive shaft to and from the driven shaft;
- a switching mechanism for selectively positioning said engaging/disengaging members at a connecting position and a disconnecting position for the drive shaft and the driven shaft; and
- a c-shaped elastic member for biasing said engaging/disengaging members in a direction where the drive shaft is engaged with the driven shaft, one end of said c-shaped elastic member projecting beyond another end;
- wherein said engaging/disengaging members are moved in a direction to disconnect the drive shaft and the driven shaft from each other against an elastic force of said elastic member, with rotation of said drive shaft when the vehicle is in a two-wheel drive mode.

12. The two-wheel drive/four-wheel drive switching device for a vehicle according to claim 11, wherein said switching mechanism comprises an electromagnetic clutch, said electromagnetic clutch including:
- a clutch disc disposed between said engaging/disengaging members and said drive shaft; and
- a coil for energizing said clutch to engage and disengage said engaging/disengaging members and said drive shaft.

13. The two-wheel drive/four-wheel drive switching device for a vehicle according to claim 11, said switching unit further comprising:
- a cylindrical outer ring, said cylindrical outer ring being in rotational engagement with said drive shaft;
- a cylindrical inner ring; and
- a retainer, said retainer supporting said engaging/disengaging members between said cylindrical outer ring and said cylindrical inner ring for engagement therewith.

14. The two-wheel drive/four-wheel drive switching device for a vehicle according to claim 13, wherein said inner ring includes a cam surface on an outer periphery thereof, and said engaging/disengaging members are a plurality of rollers in engagement with said cam surface, said plurality of rollers being mounted at spaced intervals on said retainer.

15. The vehicle according to claim 11, wherein, during the two-wheel drive mode, if braking is applied to the rear wheels, a rotational force of said drive shaft decreases so that said engaging/disengaging members are biased by the elastic member so that brakes are applied to both the front and rear wheels.

* * * * *